(12) United States Patent
Cahan (10) Patent No.: US 11,459,051 B2
(45) Date of Patent: Oct. 4, 2022

(54) GERBILLING-PROOF MONO WHEEL VEHICLE

(71) Applicant: WATT CAR INDUSTRIES LTD., Tel Aviv (IL)

(72) Inventor: Amos Cahan, Kfar Uria (IL)

(73) Assignee: Watt Car Industries Ltd., Tel Aviv (IL)

( * ) Notice: Subject to any disclaimer, the term of this patent is extended or adjusted under 35 U.S.C. 154(b) by 0 days.

(21) Appl. No.: 17/272,890

(22) PCT Filed: Aug. 26, 2019

(86) PCT No.: PCT/IL2019/050954
§ 371 (c)(1),
(2) Date: Mar. 2, 2021

(87) PCT Pub. No.: WO2020/044333
PCT Pub. Date: Mar. 5, 2020

(65) Prior Publication Data
US 2021/0188386 A1 Jun. 24, 2021

(30) Foreign Application Priority Data

Sep. 2, 2018 (IL) .......................................... 261534

(51) Int. Cl.
*B62K 1/00* (2006.01)
*B62K 11/00* (2006.01)
(Continued)

(52) U.S. Cl.
CPC ................. *B62K 1/00* (2013.01); *B62H 1/12* (2013.01); *B62J 45/40* (2020.02); *B62K 7/02* (2013.01);
(Continued)

(58) Field of Classification Search
CPC . B62K 1/00; B62K 11/007; B62K 7/02; B62J 45/40; B62L 3/00; B62M 6/00
See application file for complete search history.

(56) References Cited

U.S. PATENT DOCUMENTS 2,107,766 A 2/1938 Rose
3,260,324 A 7/1966 Suarez
(Continued)

FOREIGN PATENT DOCUMENTS

CN 201665295 U 12/2010
CN 201980345 U 9/2011
(Continued)

OTHER PUBLICATIONS

One tank on one wheel. Datasheet [online]. Nov. 1933, p. 47. [retrieved on Feb. 7, 2019 and Aug. 12, 2019]. Retrieved from: http://blog.modernmechanix.com/mags/PopularScience/11-1933/monowheel_tank.jpg.
(Continued)

*Primary Examiner* — Tony H Winner
(74) *Attorney, Agent, or Firm* — Browdy and Neimark, P.L.L.C.

(57) ABSTRACT

A gerbilling-proof monowheel vehicle comprises: (a) a wheel felloe with a tire thereon; (b) a frame rotatably mounted within the wheel felloe; the frame carrying a passenger seat; (c) moving means configured for propelling the gerbilling-proof monowheel vehicle; and (d) braking means configured for decelerating the gerbilling-proof monowheel vehicle. The gerbilling-proof monowheel further comprises at least two auxiliary wheels side-mounted on the frame for vertically stabilizing the passenger seat and preventing the gerbilling-proof monowheel from side tipover and maintaining said passenger seat in a horizontal position within said wheel felloe.

16 Claims, 5 Drawing Sheets

(51) Int. Cl.
  *B62J 45/40* (2020.01)
  *B62H 1/12* (2006.01)
  *B62K 7/02* (2006.01)
  *B62L 3/00* (2006.01)
  *B62M 6/00* (2010.01)
(52) U.S. Cl.
  CPC ............... *B62K 11/007* (2016.11); *B62L 3/00* (2013.01); *B62M 6/00* (2013.01)

(56) References Cited

U.S. PATENT DOCUMENTS

| | | | |
|---|---|---|---|
| 3,380,755 A | | 4/1968 | Pound |
| 3,762,744 A | * | 10/1973 | Sidlauskas ............... B62K 1/00 280/207 |
| 4,102,542 A | * | 7/1978 | Pirre, Jr. .................. B62K 1/00 180/10 |
| 5,370,410 A | | 12/1994 | Heijman et al. |
| 6,298,934 B1 | * | 10/2001 | Shteingold ............. B62D 55/04 180/10 |
| 8,219,308 B2 | | 7/2012 | Leeser |
| 2005/0072616 A1 | * | 4/2005 | Pal ....................... B60K 7/0007 180/218 |

FOREIGN PATENT DOCUMENTS

| | | |
|---|---|---|
| CN | 102582737 A | 7/2012 |
| CN | 202429301 U | 9/2012 |
| CN | 202806977 U | 3/2013 |
| CN | 203318594 U | 12/2013 |
| CN | 204355218 U | 5/2015 |
| CN | 104760644 A | 7/2015 |
| DE | 69110899 T2 | 11/1995 |
| FR | 526439 A | 10/1921 |
| FR | 2697792 A | 5/1994 |
| RU | 2456195 C2 | 7/2012 |
| WO | 2017/203298 A1 | 11/2017 |

OTHER PUBLICATIONS

Dyno-Wheel Drives New Motor Bus. Datasheet [online]. Jun. 1935, p. 87. [Retreived on Aug. 12, 2019]. Retrieved from: http://blog.modernmechanix.com/mags/ModernMechanix/6-1935/dyno_wheel.jpg.

* cited by examiner

GERBILLING-PROOF MONO WHEEL VEHICLE

FIELD OF THE INVENTION

The present invention refers to a gerbilling-proof monowheel motorized vehicle and, more particularly, to a gerbilling-proof monowheel vehicle provided with manupulatable auxiliary side wheels configured for preventing the aforesaid gerbilling-proof monowheel vehicle from deviation from equilibrium position forward when decelerated and backward when accelerated.

BACKGROUND OF THE INVENTION

Ever since the nineteenth century, numerous types of monowheels have been disclosed in related studies or to the market. Due to the maturity of motor power technologies, speed and convenience of motorized monowheels are now further enhanced by the integration of traditional monocycles and motor power.

In addition, as the motorized monowheel proceeds, any attempt to achieve brakeage or slowdown of the machine would cause portions inside the wheel (the seat and motor in particular) to rotate in the direction of motion. Such gerbilling would very often incur discomfort for the rider.

U.S. Pat. No. 8,219,308 discloses an engine-propelled monowheel vehicle comprising two wheels, close together, that circumscribe the remainder of the vehicle. When the vehicle is moving forward, the closely spaced wheels act as a single wheel, and the vehicle turns by leaning the wheels. A single propulsion system provides a drive torque that is shared by the two wheels. A separate steering torque, provided by a steering motor, is added to one wheel while being subtracted from the other wheel, enabling the wheels to rotate in opposite directions for turning the vehicle at zero forward velocity. The vehicle employs attitude sensors, for sensing roll, pitch, and yaw, and an automatic balancing system. A flywheel in the vehicle spins at a high rate around a spin axis, wherein the spin axis is rotatable with respect to the vehicle's frame. The axis angle and flywheel spin speed are continually adjustable to generate torques for automatic balancing.

Introducing a flywheel driven by a separate motor into the monowhcel vehicle for balancing it makes the vehicle heavier and less effective. There is a long-felt and unmet need to provide a gerbilling-proof monowheel vehicle balanceablc by a mechanism driven by a propulsion motor.

SUMMARY OF THE INVENTION

It is hence one object of the invention to disclose a gerbilling-proof monowheel vehicle comprising: (a) a wheel felloe with a tire thereon; (b) a frame rotatably mounted within the wheel felloe; the frame carrying a passenger seat; (c) moving means configured for propelling the gerbilling-proof monowheel vehicle; and (d) braking means configured for decelerating the gerbilling-proof monowheel vehicle.

It is a core purpose of the invention to provide the gerbilling-proof monowheel further comprising at least two auxiliary wheels side-mounted on the frame for vertically stabilizing the passenger seat and preventing the gerbilling-proof monowheel from side tipover and maintaining said passenger seat in a horizontal position within said wheel felloe.

Another object of the invention is to disclose the auxiliary wheels synchronically displaceable opposite to a direction of movement when the gerbilling-proof monowheel vehicle is accelerated and along the direction of movement when the gerbilling-proof monowheel vehicle is decelerated.

A further object of the invention is to disclose the auxiliary wheels inclinable relative to the folloe during a turning maneuver.

A further object of the invention is to disclose the frame comprising a plurality of rollers running along the felloe.

A further object of the invention is to disclose the moving means comprising at least one mover selected from the group consisting of an electric motor, an internal combustion engine, a human-powered mover and any combination thereof, the auxiliary wheels are individually driven by the moving means.

A further object of the invention is to disclose the wheel felloe having a diameter ranging between 0.5 m and 4 m.

Another object of the invention is to disclose the wheel felloe having the diameter of 2 m.

A further object of the invention is to disclose the gerbilling-proof monowheel vehicle comprising two side-mounted passenger seats mechanically connected to the frame.

A further object of the invention is to disclose the gerbilling-proof monowheel vehicle comprising a mechanism of mechanical displacement of the auxiliary wheels in a manual manner.

A further object of the invention is to disclose the gerbilling-proof monowheel vehicle comprising a control unit configured for detecting an acceleration applied to the gerbilling-proof monowheel vehicle and a servo mechanism controlled by the control unit and configured for synchronically displacing the auxiliary wheels according to a detected acceleration.

A further object of the invention is to disclose the servo mechanism comprising an articulated arm configured for manipulating for the auxiliary wheel.

A further object of the invention is to disclose the the servo mechanism comprising a guideway and a slide carrying the auxiliary wheel and movable within the guideway.

A further object of the invention is to disclose the servo mechanism comprising a hydraulic cylinder configured for manipulating the auxiliary wheels.

A further object of the invention is to disclose the control unit configured for dynamically controlling a position of the auxiliary wheels according at least one parameter selected from the group consisting of a passenger weight, a road condition, a vehicle speed and any combination thereof.

A further object of the invention is to disclose the gerbilling-proof monowheel vehicle comprising at least one sensor selected from the group consisting of a gyroscope, an accelerometer, an imager and any combination thereof, the at least one sensor is connected to the control unit.

A further object of the invention is to disclose the braking means based on a friction mechanism.

A further object of the invention is to disclose the braking means based on an electromagnetic mechanism.

A further object of the invention is to disclose a method of using a gerbilling-proof monowheel vehicle. The aforesaid method comprises steps of: (a) providing the gerbilling-proof monowheel vehicle comprising: (i) a wheel felloe with a tire thereon; (ii) a frame rotatably mounted within the wheel felloe; the frame carrying a passenger seat; (iii) moving means configured for propelling the gerbilling-proof monowheel vehicle; and (iv) braking means configured for decelerating the gerbilling-proof monowheel vehicle; the gerbilling-proof gerbilling-proof monowheel further comprises at least two auxiliary wheels side-mounted on the frame for stabilizing the passenger seat in a vertical position and preventing the gerbilling-proof monowheel from side tipover and maintaining said passenger seat in a horizontal position within said wheel felloe; (b) driving the gerbilling-proof monowheel vehicle.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a gerbilling-proof monowheel vehicle and a method of using the same.

Driving in the metropolitan area requires handling challenges such as heavy traffic, narrow, difficult to maneuver streets and shortage of parking space. The present invention relates to a passenger vehicle suited to meet these challenges.

The present invention is designed for preventing the gerbilling-proof monowheel vehicle from deviation from equilibrium position forward when decelerated and backward when accelerated.

Figure 1:
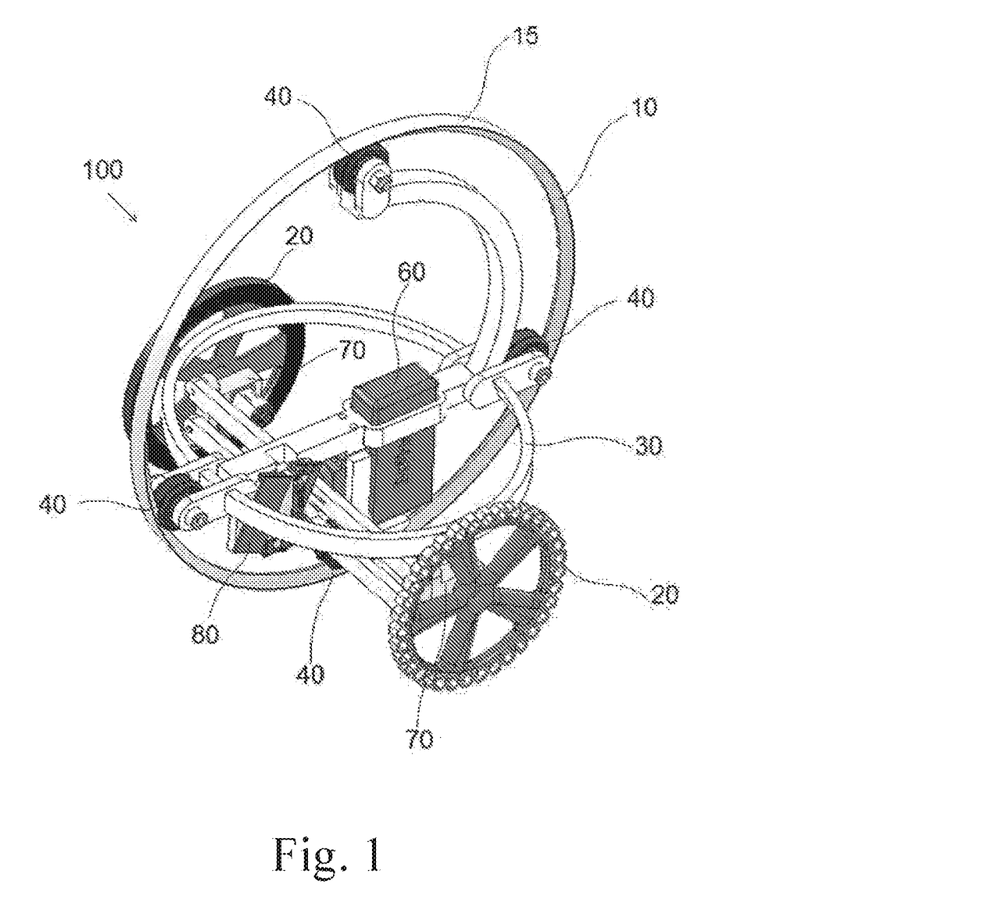
FIG. 1 is a perspective structural view of a gerbilling-proof monowheel vehicle.

Reference is now made to FIG. 1 showing a perspective structural view of gerbilling-proof monowheel vehicle 100. Frame 30 is rotatably mounted on rollers 40 within felloe 10 provided with tire 15 on its external side. Auxiliary wheels 20 are side-mounted on frame 30. Each auxiliary wheel 20 is individually driven by electric motor 70 which is energized by battery 60. An internal combustion engine and a human-powered mover as an alternative of electric motor 70 are also in the scope of the present invention. Numeral 80 refers to an arrangement comprising a control unit and at least one sensor such that a gyroscope, an accelerometer or an imager. The control unit is configured for detecting acceleration applied to the gerbilling-proof monowheel vehicle. The control unit controls a servo mechanism which synchronically displaces the auxiliary wheels according to a detected acceleration. Inclination of auxiliary wheel 20 in the direction of a turning maneuver is also in the scope of the present invention. Specifically, auxiliary wheels are synchronically displaced opposite to a direction of movement when gerbilling-proof monowheel vehicle 100 is accelerated and along the direction of movement when gerbilling-proof monowheel vehicle 100 is decelerated.

Figure 2A:
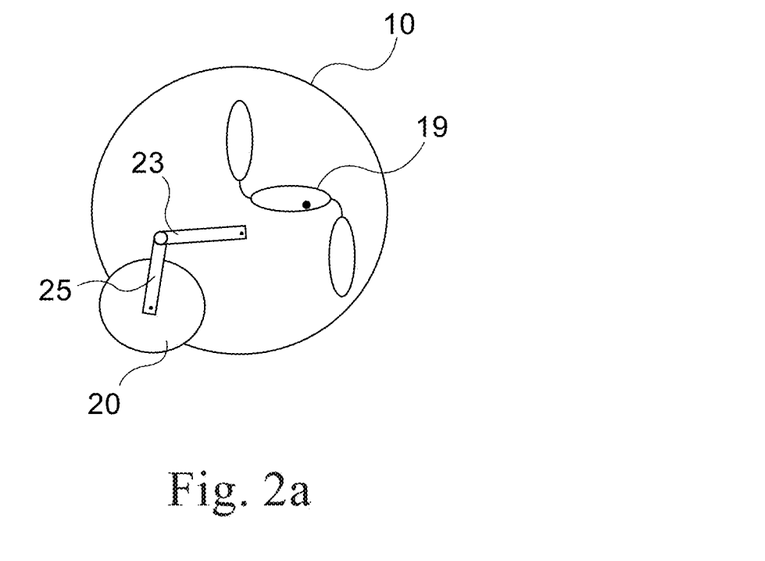
FIGS. 2a and 2b are schematic views of a servo mechanism including an articulated arm.
Figure 2B:
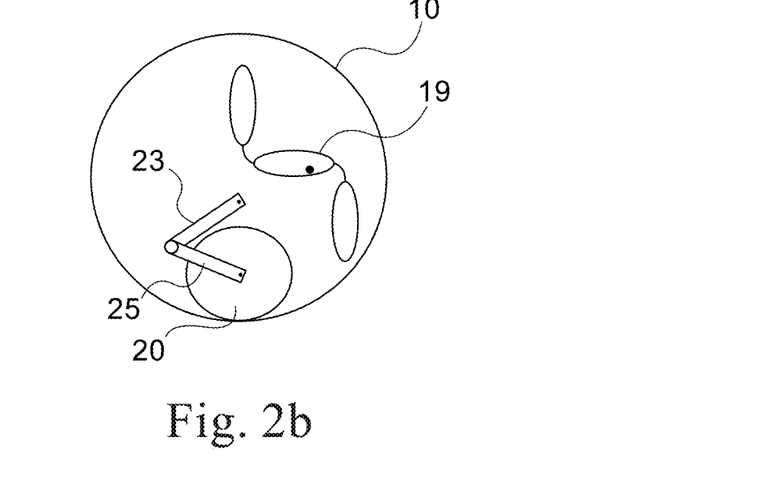

A diameter of felloe 10 is between 0.5 m and 4 m. The preferable embodiment of the present invention corresponds to the diameter of about 2 m. Gerbilling-proof monowheel vehicle 100 is provided with one or two passenger seats 19 (FIGS. 2a and 2b) which are side mounted. Positioning passenger seats 19 spaced apart from fellow 10 provides minimally obstructed vision of the environment. Mounting a canopy is an alternative improving passenger safety and protects elements of the structure of gerbilling-proof monowheel vehicle 100. Reference is now made to FIGS. 2a and 2b showing schematically an articulated arm configured for manipulating auxiliary wheel 20 in two optional positions. The articulated arm includes levers 23 and 25 hingedly interconnected to each other. According to present invention, the articulated arm moves auxiliary wheel 20 in a direction which is opposite to a direction of movement when gerbilling-proof monowheel vehicle 100 is accelerated and along the direction of movement when gerbilling-proof monowheel vehicle 100 is decelerated.

Figure 3A:
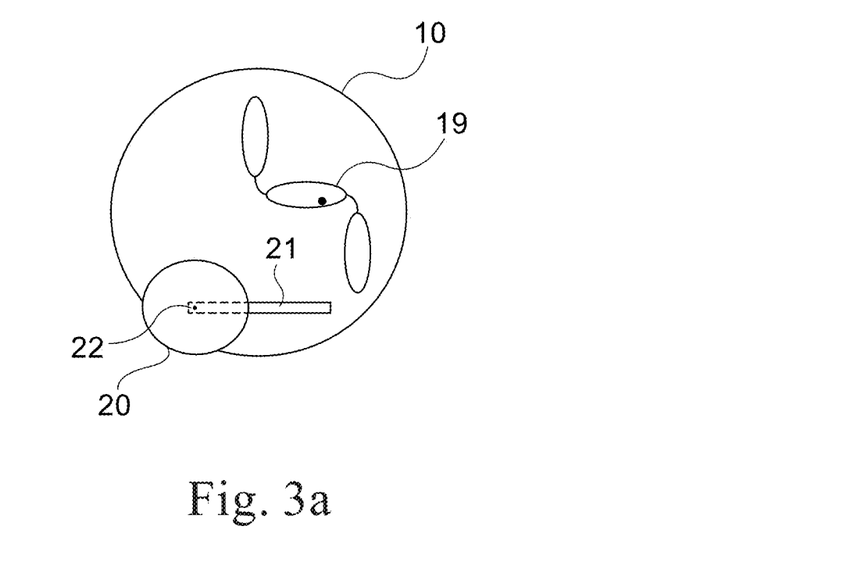
FIGS. 3a and 3b are schematic views of a servo mechanism including a guideway and a slide.
Figure 3B:
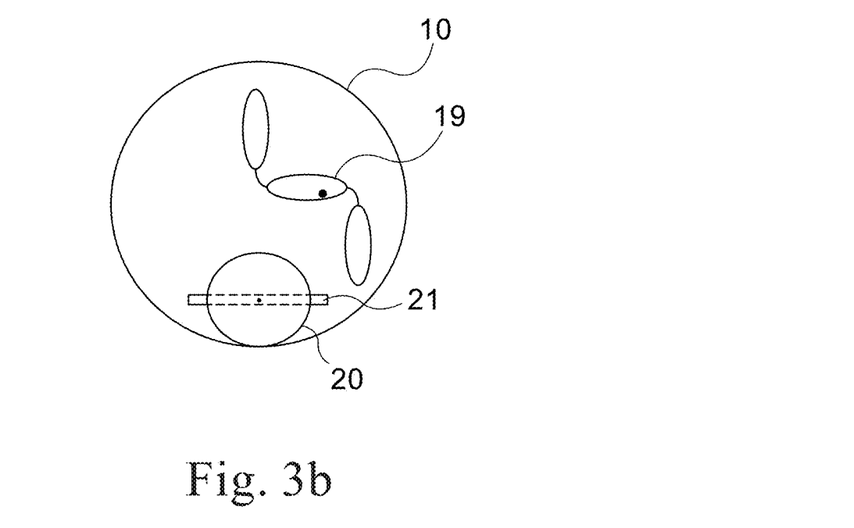

Reference is now made to FIGS. 3a and 3b showing schematically an articulated arm configured for manipulating auxiliary wheel 20 in two optional positions. Axis 22 of auxiliary wheel 20 is movable along guideway 21. Two optional positions of auxiliary wheel 20 are shown in FIGS. 3a and 3b.

Figure 4A:
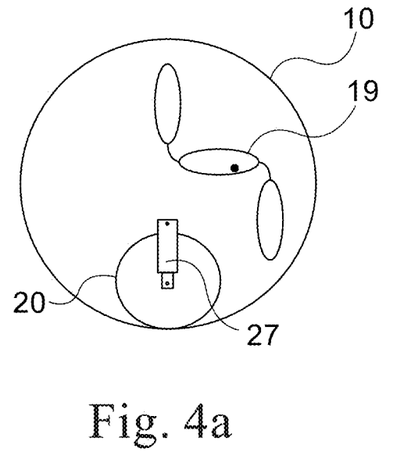
FIGS. 4a and 4b are schematic views of a servo mechanism including a hydraulic cylinder.
Figure 4B:
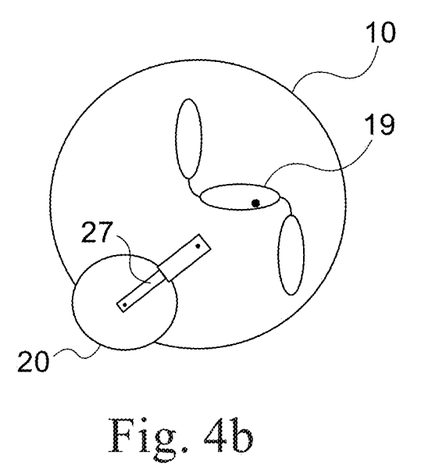

Reference is now made to FIGS. 4a and 4b showing schematically hydraulic cylinder 27 configured for changing its orientation and length such that auxiliary wheel 20 is manipulable in positions as described above. A motor-controlled suspension is also in the scope of the present invention.

Braking means can control the felloe and/or auxiliary wheels in order to minimize relative speed differences between them during acceleration and braking. Friction-based and electromagnetic brakes are in the scope of the present invention. The control unit can the value of deceleration to maintain the vehicle directionally stable. During deceleration, kinetic energy may be transformed to electric energy and used to charge the vehicle's battery.

Figure 5A:
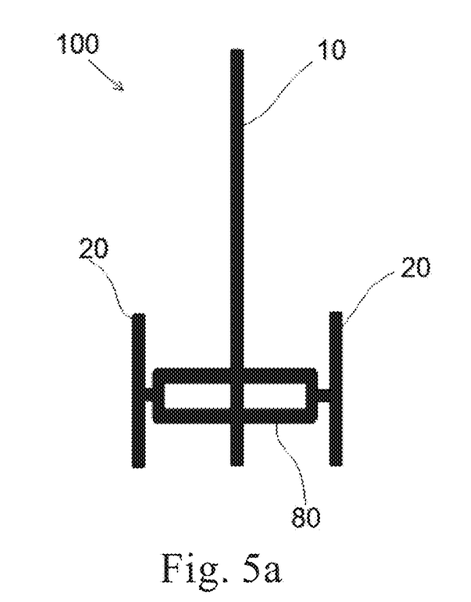
FIGS. 5a and 5b are schematic views of a gerbilling-proof monowheel vehicle during a straight motion and a turning maneuverer, respectively.
Figure 5B:
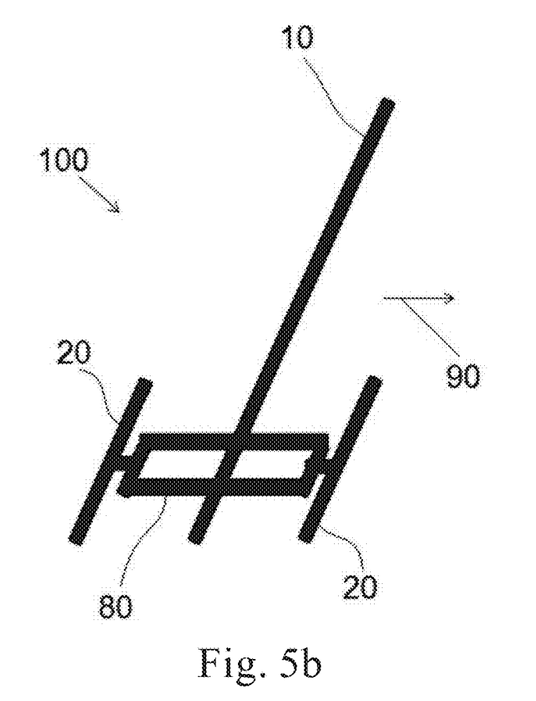

Reference is now made to FIGS. 5a and 5b presenting schematic views of gerbilling-proof monowheel vehicle 100 during a straight motion and a turning maneuverer, respectively. In FIG. 5a, felloe 10 and auxiliary wheels 20 are in a vertical position when of gerbilling-proof monowheel vehicle 100 moves in a straight manner. Contrary to this, FIG. 5b corresponding to the turning maneuverer, shows felloe 10 and auxiliary wheels 20 inclined.

According to the present invention a gerbilling-proof monowheel vehicle comprises: (a) a wheel felloe with a tire thereon; (b) a frame rotatably mounted within the wheel felloe; the frame carrying a passenger seat; (c) moving means configured for propelling the gerbilling-proof monowheel vehicle; and (d) braking means configured for decelerating the gerbilling-proof monowheel vehicle.

It is a core feature of the invention to provide the the gerbilling-proof monowheel further comprising at least two auxiliary wheels side-mounted on the frame for vertically stabilizing the passenger seat and preventing the gerbilling-proof monowheel from side tipover and maintaining said passenger seat in a horizontal position within said wheel felloe.

According to one embodiment of the present invention, the auxiliary wheels are synchronically displaceable opposite to a direction of movement when the gerbilling-proof monowheel vehicle is accelerated and along the direction of movement when the gerbilling-proof monowheel vehicle is decelerated.

According to a further embodiment of the present invention, the auxiliary wheels are inclinable relative to the folloe during a turning maneuver.

According to a further embodiment of the present invention, the frame comprises a plurality of rollers running along the felloe.

According to a further embodiment of the present invention, the moving means comprises at least one mover selected from the group consisting of an electric motor, an internal combustion engine, a human-powered mover and any combination thereof, the auxiliary wheels are individually driven by the moving means.

According to a further embodiment of the present invention, the wheel felloe has a diameter ranging between 0.5 m and 4 m.

Another object of the invention is to disclose the wheel felloe having the diameter of 2 m.

According to a further embodiment of the present invention, the gerbilling-proof monowheel vehicle comprises two side-mounted passenger seats mechanically connected to the frame.

A further object of the invention is to disclose the gerbilling-proof monowheel vehicle comprising a mechanism of mechanical displacement of the auxiliary wheels in a manual manner.

According to a further embodiment of the present invention, the gerbilling-proof monowheel vehicle comprises a control unit configured for detecting an acceleration applied to the gerbilling-proof monowheel vehicle and a servo mechanism controlled by the control unit and configured for synchronically displacing the auxiliary wheels according to a detected acceleration.

According to a further embodiment of the present invention, the servo mechanism comprises an articulated arm configured for manipulating for the auxiliary wheel.

A further object of the invention is to disclose the the servo mechanism comprising a guideway and a slide carrying the auxiliary wheel and movable within the guideway.

According to a further embodiment of the present invention, the servo mechanism comprises a hydraulic cylinder configured for manipulating the auxiliary wheel.

According to a further embodiment of the present invention, the control unit is configured for dynamically controlling a position of the auxiliary wheels according at least one parameter selected from the group consisting of a passenger weight, a road condition, a vehicle speed and any combination thereof.

According to a further embodiment of the present invention, the gerbilling-proof monowheel vehicle comprises at least one sensor selected from the group consisting of a gyroscope, an accelerometer, an imager and any combination thereof, the at least one sensor is connected to the control unit.

According to a further embodiment of the present invention, the braking means is based on a friction mechanism.

According to a further embodiment of the present invention, the braking means is based on an electromagnetic mechanism.

According to a further embodiment of the present invention, a method of using a gerbilling-proof monowheel vehicle is disclosed. The aforesaid method comprises steps of: (a) providing the gerbilling-proof monowheel vehicle comprising: (i) a wheel felloe with a tire thereon; (ii) a frame rotatably mounted within the wheel felloe; the frame carrying a passenger seat; (iii) moving means configured for propelling the gerbilling-proof monowheel vehicle; and (iv) braking means configured for decelerating the gerbilling-proof monowheel vehicle; the gerbilling-proof gerbilling-proof monowheel further comprises at least two auxiliary wheels side-mounted on the frame for stabilizing the passenger seat in a vertical position and preventing the gerbilling-proof monowheel from side tipover and maintaining said passenger seat in a horizontal position within said wheel felloe; (b) driving the gerbilling-proof monowheel vehicle.

The invention claimed is:

1. A gerbilling-proof monowheel vehicle comprising:
   a. a wheel felloe with a tire thereon;
   b. a frame rotatably mounted within said wheel felloe; said frame carrying a passenger seat;
   c. moving means configured for propelling said gerbilling-proof monowheel vehicle;
   d. braking means configured for decelerating said gerbilling-proof monowheel vehicle;
   e. at least two auxiliary wheels side-mounted on said frame vertically;
   f. a control unit;
   g. a servo mechanism attached to said at least two auxiliary wheels;
   wherein said at least two auxiliary wheels are used to stabilize said vehicle and to prevent said gerbilling-proof monowheel from tipping sideways and to maintain said passenger seat in a horizontal position within said wheel felloe; and
   wherein said at least two auxiliary wheels are synchronically displaceable opposite to a direction of movement when said gerbilling-proof monowheel vehicle is accelerated and along said direction of movement when said gerbilling-proof monowheel vehicle is decelerated; and
   wherein said servo mechanism is controllable by said control unit and configured for synchronically displacing said at least two auxiliary wheels according to a detected acceleration.

2. The gerbilling-proof monowheel vehicle according to claim 1, wherein said at least two auxiliary wheels are inclinable relative to said felloe during a turning maneuver.

3. The gerbilling-proof monowheel vehicle according to claim 1, wherein said frame comprises a plurality of rollers running along said felloe.

4. The gerbilling-proof monowheel vehicle according to claim 1, wherein said moving means comprises at least one mover selected from a group consisting of an electric motor, an internal combustion engine, a human-powered mover and any combination thereof; said at least two auxiliary wheels are individually driven by said moving means.

5. The gerbilling-proof monowheel vehicle according to claim 1, wherein said wheel felloe has a diameter ranging between 0.5 m and 4 m.

6. The gerbilling-proof monowheel vehicle according to claim 5, wherein said wheel felloe has said diameter of 2 m.

7. The gerbilling-proof monowheel vehicle according to claim 1, wherein the passenger seat is the only passenger seat carried by said frame.

8. The gerbilling-proof monowheel vehicle according to claim 1 further comprising a mechanism for mechanical displacing of said at last two auxiliary wheels.

9. The gerbilling-proof monowheel vehicle according to claim 1, wherein said servo mechanism comprises an articulated arm configured for manipulating one of said at least two auxiliary wheels.

10. The gerbilling-proof monowheel vehicle according to claim 1, wherein said servo mechanism comprises a guideway and a slide configured to enable translation of at least one of said at least two auxiliary wheels along said guideway and slide.

11. The gerbilling-proof monowheel vehicle according to claim 1, wherein said servo mechanism comprises a hydraulic cylinder configured for manipulating said at least two auxiliary wheels.

12. The gerbilling-proof monowheel vehicle according to claim 1, wherein said control unit is configured for dynamically controlling a position of said at least two auxiliary wheels according to at least one parameter selected from a group consisting of a passenger weight, a road condition, a vehicle speed and any combination thereof.

13. The gerbilling-proof monowheel vehicle according to claim 1 further comprising at least one sensor selected from a group consisting of a gyroscope, an accelerometer, an imager and any combination thereof; said at least one sensor is connected to said control unit.

14. The gerbilling-proof monowheel vehicle according to claim 1, wherein said braking means is based on a friction mechanism.

15. The gerbilling-proof monowheel vehicle according to claim 1, wherein said braking means is based on an electromagnetic mechanism.

16. A method of using a gerbilling-proof monowheel vehicle; said method comprising steps of:
   a. providing said gerbilling-proof monowheel vehicle consisting:
      i. a wheel felloe with a tire thereon;
      ii. a frame rotatably mounted within said wheel felloe; said frame carrying a passenger seat;
      iii. moving means configured for propelling said gerbilling-proof monowheel vehicle;
      iv. braking means configured for decelerating said gerbilling-proof monowheel vehicle;
      v. at least two auxiliary wheels side-mounted on said frame vertically;
      vi. a control unit;
      vii. a servo mechanism controllable by said control unit;
   wherein said at least two auxiliary wheels are used to stabilize said vehicle and to prevent said gerbilling-proof monowheel from tipping sideways and to maintain said passenger seat in a horizontal position within said wheel felloe; and
   wherein said at least two auxiliary wheels are synchronically displaceable opposite to a direction of movement when said gerbilling-proof monowheel vehicle is accelerated and along said direction of movement when said gerbilling-proof monowheel vehicle is decelerated; and wherein said servo mechanism is controlled by said control unit and configured for synchronically displacing said at least two auxiliary wheels according to a detected acceleration;
   b. driving said gerbilling-proof monowheel vehicle.

* * * * *